US006970990B2

(12) United States Patent
Rogers et al.

(10) Patent No.: US 6,970,990 B2
(45) Date of Patent: Nov. 29, 2005

(54) VIRTUAL MODE VIRTUAL MEMORY MANAGER METHOD AND APPARATUS

(75) Inventors: Mark Douglass Rogers, Austin, TX (US); Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/261,866

(22) Filed: Sep. 30, 2002

(65) Prior Publication Data

US 2004/0078631 A1 Apr. 22, 2004

(51) Int. Cl.[7] .............................................. G06F 12/00
(52) U.S. Cl. ....................... 711/200; 711/202; 711/203; 711/206; 711/207; 711/208; 711/216
(58) Field of Search ........................ 711/205, 206, 207, 711/216, 200, 202, 203, 208

(56) References Cited

U.S. PATENT DOCUMENTS 5,835,964 A * 11/1998 Draves et al. .............. 711/207
6,308,247 B1 * 10/2001 Ackerman et al. .......... 711/206
6,430,667 B1 * 8/2002 Loen .......................... 711/202
6,430,668 B2 * 8/2002 Belgard ...................... 711/202
6,760,787 B2 * 7/2004 Forin .......................... 710/18

* cited by examiner

*Primary Examiner*—Donald Sparks
*Assistant Examiner*—Ngoc V. Dinh
(74) *Attorney, Agent, or Firm*—Duke W. Yee; Mark E. McBurney; Lisa L. B. Yociss

(57) ABSTRACT

A virtual mode virtual memory manager method and apparatus are provided. Mechanisms are provided for allowing a virtual memory manager to operate in virtual mode utilizing virtual addresses for all of its own data structures, allowing for physical discontinuity of the physical memory backing those data structures. First order virtual memory manager metadata is included for resolving system wide virtual memory page faults. Second order virtual memory manager metadata is provided to resolve faults on the first order virtual memory manager metadata. The second order virtual memory manager metadata is associated with pinned entries in a page table and thus, faults on the second order virtual memory manager metadata cannot occur.

26 Claims, 5 Drawing Sheets

FIG. 3
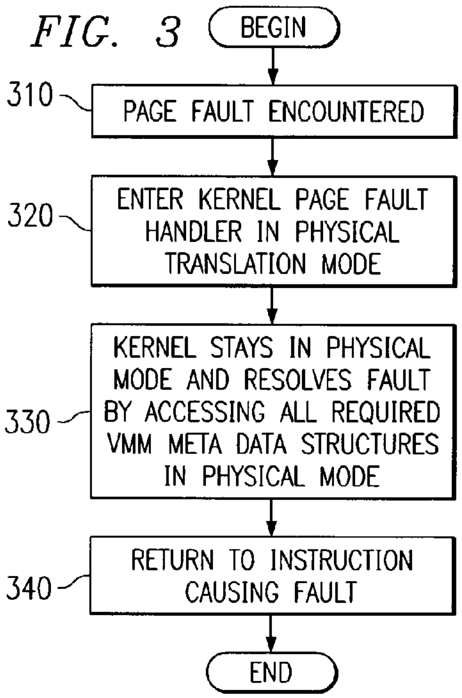
FIG. 5
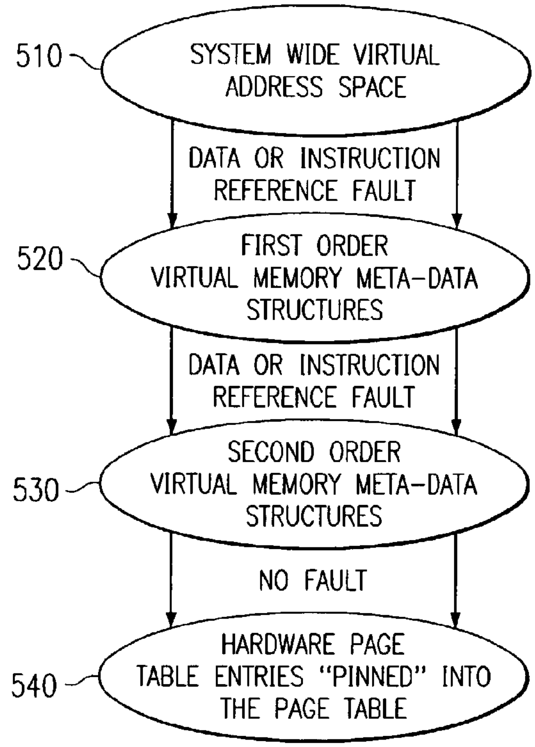
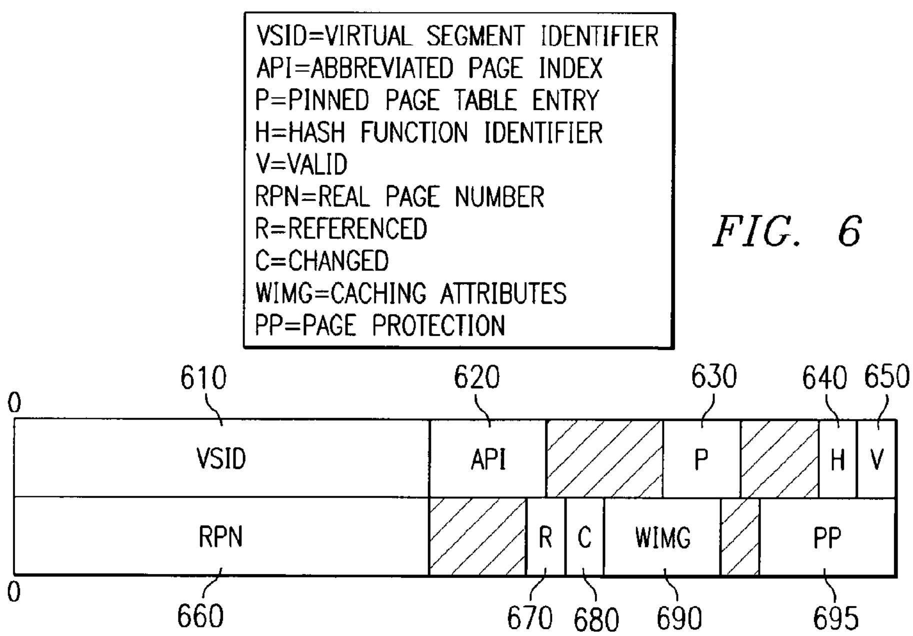
FIG. 6

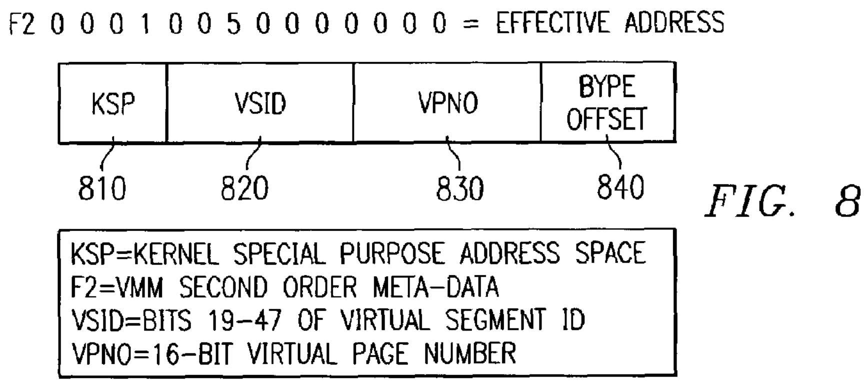
*FIG. 8*
*FIG. 9*
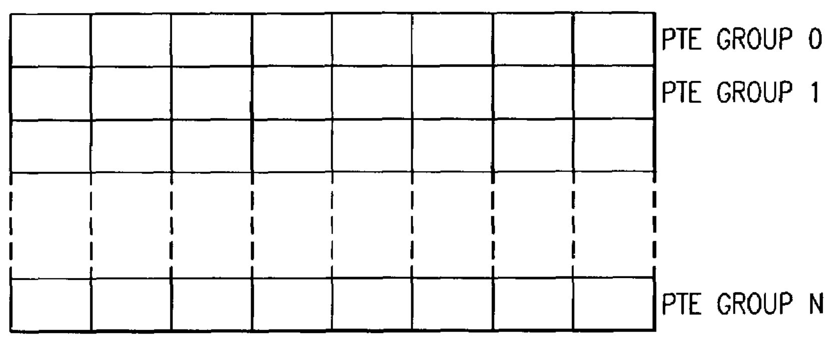
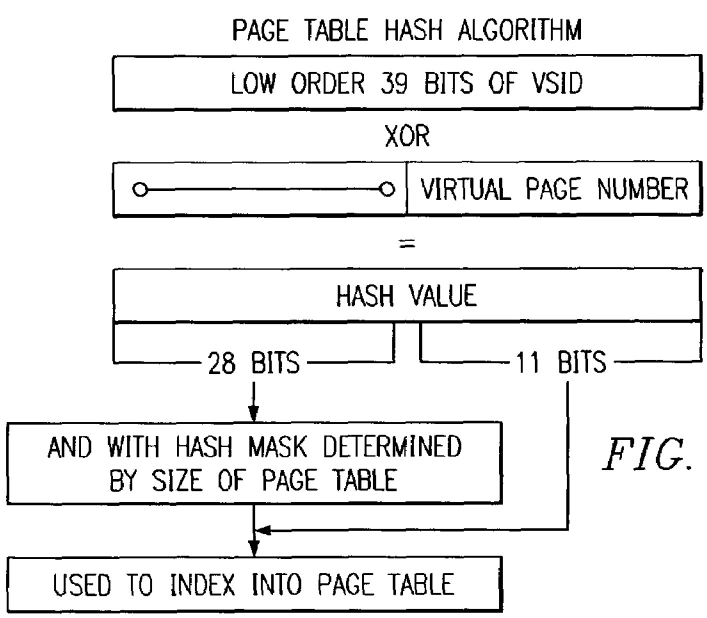
*FIG. 10*

VIRTUAL MODE VIRTUAL MEMORY MANAGER METHOD AND APPARATUS

BACKGROUND OF THE INVENTION

1. Technical Field

The present invention is directed to a virtual mode virtual memory manager method and apparatus. More specifically, the present invention is directed to a virtual memory manager that operates using virtual memory rather than physical memory.

2. Description of Related Art

Operating systems are responsible for managing the virtual memory of a computer system. Virtual memory is addressable memory that extends beyond the limits of the available physical memory and is thus, "virtual." The principal benefit of using virtual memory is that a user can run more applications at once and work with larger amounts of data than would be possible if the logical address space were limited to the available physical memory. Instead of equipping a computer with amounts of physical memory large enough to handle all possible needs, the user can install only enough physical memory to meet average needs. During those occasional times when more memory is needed for large tasks or many applications, the user can take advantage of virtual memory.

The operating system uses a Virtual Memory Manager (VMM) to perform virtual memory management. Virtual memory management involves the establishment of virtual address translations to real physical memory locations. The VMM also provides a number of routines that software can use to modify or obtain information about the software operations. For example, the VMM may be used to hold portions of the logical address space in physical memory, lock portions of the logical address space in their physical memory locations, determine whether a particular portion of the logical address space is currently in physical memory, and determine, from a logical address, the physical address of a block of memory.

The VMM extends the logical address space by using part of an available secondary storage, e.g., a hard disk, to hold portions of applications and data that are not currently in use in physical memory. When an application needs to operate on portions of memory that have been transferred to disk, the VMM loads those portions back into physical memory by making them trade places with other, unused segments of memory. This process of moving portions, or pages, of memory between physical RAM and the hard disk is called paging.

When a software component tries to access data in a page of memory that does not currently have a valid virtual to physical translation resident in the translation hardware, the CPU issues a special kind of bus error known as a page fault. Translation hardware is platform specific, but usually includes translation lookaside buffers and a hardware page table. The VMM intercepts page faults and tries to load the necessary translation into the hardware page table. In some cases not only does the referenced page not have a valid translation in the page table, but is also not resident in physical memory. In this case, not only does the VMM have to load a valid translation into the hardware page table, but it must also load the affected page or pages into physical memory. The VMM does so by executing its own internal page-fault handler.

Typically, the VMM operates in real mode, i.e. based on physical memory addresses, to avoid the potential catch-22 deadlock cases of needing to resolve a virtual memory fault, e.g., page fault, on behalf of itself. The problem with running the VMM in real mode is that it requires all data structures that it references to be in addressable contiguous physical memory. Several problems result due to this requirement.

First, the larger the physical memory configuration of a machine, the larger the data structures need to be to manage it. Thus, more and more addressable, contiguous physical memory is required as the memory size scales upwards. On partitionable systems, this presents a significant problem since only a portion of the physical address space is directly accessible to the operating system and that portion restricts the dynamic capabilities of the system such as for memory removal or addition.

Second, the data structures used to manage virtual memory can not be easily scaled smaller or larger. This is due to the requirement on physical addressability in the case of dynamic memory removal or addition. When relying on physical mode references to data structures, the structures which by definition are logically contiguous must then be physically contiguous in memory. The difficulty in scaling these data structures is that in order to dynamically grow one of them larger, the specific physical memory pages starting at the end of the currently sized data structure must be reclaimed for the contiguous growth of the structure.

Third, with Non-Uniform Memory Access (NUMA) systems, where the physical memory may be spread across multiple non-uniform access nodes, required physical addressability to these data structures results in the entire data structure residing in the memory of a single NUMA node. With NUMA systems, there is a performance cost associated with having to access memory of other nodes in the system. It is much more beneficial to be able to store portions of a data structure that is accessed by a node in local memory rather than having to access the data structure on another node's memory. Thus it is desirable to have the logically contiguous VMM data structures be physically discontiguous and distributed across the physical memory of each NUMA node.

Since all of the problems discussed above stem from the fact that VMM is run in real mode and thus, requires addressable contiguous physical memory, it would be beneficial to have a method and apparatus for running a VMM in virtual mode.

SUMMARY OF THE INVENTION

The present invention provides a virtual mode virtual memory manager method and apparatus. With the present invention, mechanisms are provided for allowing a virtual memory manager to operate in virtual mode utilizing virtual addresses for all of its own data structures, thereby allowing for physical discontinuity of the physical memory backing those data structures. These mechanisms solve a number of problems associated with running a virtual memory manager in virtual mode including avoiding deadlocks, handling recursive faults, optimal hash distribution of virtual page translations for VMM metadata, and no significant performance degradation or additional path length in providing the virtual mode virtual memory manager.

The problem of avoiding deadlocks is addressed by the present invention by defining a set of virtual memory manager (VMM) data structures and VMM code text that must always be addressable, i.e. no faults are allowed on these data structures and code text, in order to guarantee forward progress. These data structures and code text, or code pages, are then pinned into the hardware page table. Pinning a hardware page table entry is a platform specific function. For example, in the PowerPC architecture, this means that pinned entries cannot be evicted from the hardware page table during a reload operation.

The problem of handling recursive faults is addressed by the present invention by not requiring that all of the VMM data structures always be addressable. By allowing some VMM data structures to be non-addressable at times, the pinned page table entry footprint caused by all of these data structures is minimized. Specifically, a second class of VMM data structures is defined that allows the VMM to page fault on them. A stack of fault handling execution stacks is implemented with the VMM fault handling code being completely reentrant. As a result, faults on the actual VMM are allowed and are handled by the present invention.

The problem of determining an optimal hash distribution of virtual page translations for VMM metadata is addressed by the present invention as a result of the solution to the problem of avoiding deadlocks. Specifically, the pinned page table entries need to be distributed throughout the page table to avoid filling up a page table group with only pinned entries. Poorly placed pinned page table entries can adversely affect performance if there are multiple pinned page table entries in a single page table entry group. Performance bottlenecks can result due to hash collisions to a group that must share fewer slots due to the presence of pinned page table entries.

The virtual addresses of the pages are used to hash to a page table entry group (PTEG) within the page table. In the case of a full PTEG, unless the operating system can evict an entry, forward progress cannot be guaranteed for a page fault on a virtual address mapping. Thus, in the present invention, a VMM data structure virtual address space is defined such that it results in a hash distribution yielding no more than one pinned PTE per PTEG.

With the present invention, virtual segment identifiers for each VMM metadata segment that have no hash collision with virtual page numbers from any VMM metadata segment are selected. That is, virtual segment identifiers which are used along with a virtual page number to compute a page table entry group index into a hardware page table are selected so that every possible virtual segment identifier and virtual page number combination will result in a unique page table entry group index. This is done essentially by not utilizing any virtual segment identifier bits that might conflict with any virtual page number bits in the hash algorithm, and therefore only incrementing special virtual segment identifiers starting with a bit that is more significant than the most significant virtual page number bit.

With regard to the problem of not having any significant performance degradation or additional path length, when running the fault handling in physical mode, no faults were encountered by the fault handler and no space was occupied in the hardware page table for metadata segments. With the present invention, fault handling is running in virtual mode and thus, recursive faults can be encountered, segment lookaside buffer faults can be encountered, and the issue of page table entry group distribution of pinned page table entries exists. The issue of page table group distribution is handled in the manner previously discussed. The issue of recursive faults is handled by providing a mechanism for generating an effective address space from a second order metadata (KSP) or Kernel Special Purpose address space.

With the present invention, the KSP address has encoded therein, an indicator of KSP memory and the KSP virtual segment identifier. This means that at segment looksaside buffer fault time, no costly data structure lookup must be done, and in just a few machine instructions the faulting address can be recognized as a KSP address, the virtual segment identifier can be extracted, and the segment lookaside buffer reloaded. The cost of recursive faults is handled by monitoring statistics of second order faults and promoting a first order metadata structure to be a second order (pinned page table entry) metadata structure if it exceeds a threshold of allowed faults.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of a prior art method of page fault handling;

FIG. 5 is an exemplary diagram illustrating relationships between virtual memory manager data structures and code text;

FIG. 6 is an exemplary diagram illustrating a page table entry in accordance with the present invention;

FIG. 8 is an exemplary diagram illustrating a second order virtual memory manager metadata virtual address space in accordance with the present invention;

FIG. 9 is an exemplary diagram of a page table in accordance with the present invention; and FIG. 10 is an exemplary diagram of a page table hash algorithm in accordance with the present invention.

DETAILED DESCRIPTION OF THE PREFERRED EMBODIMENT

Figure 1:
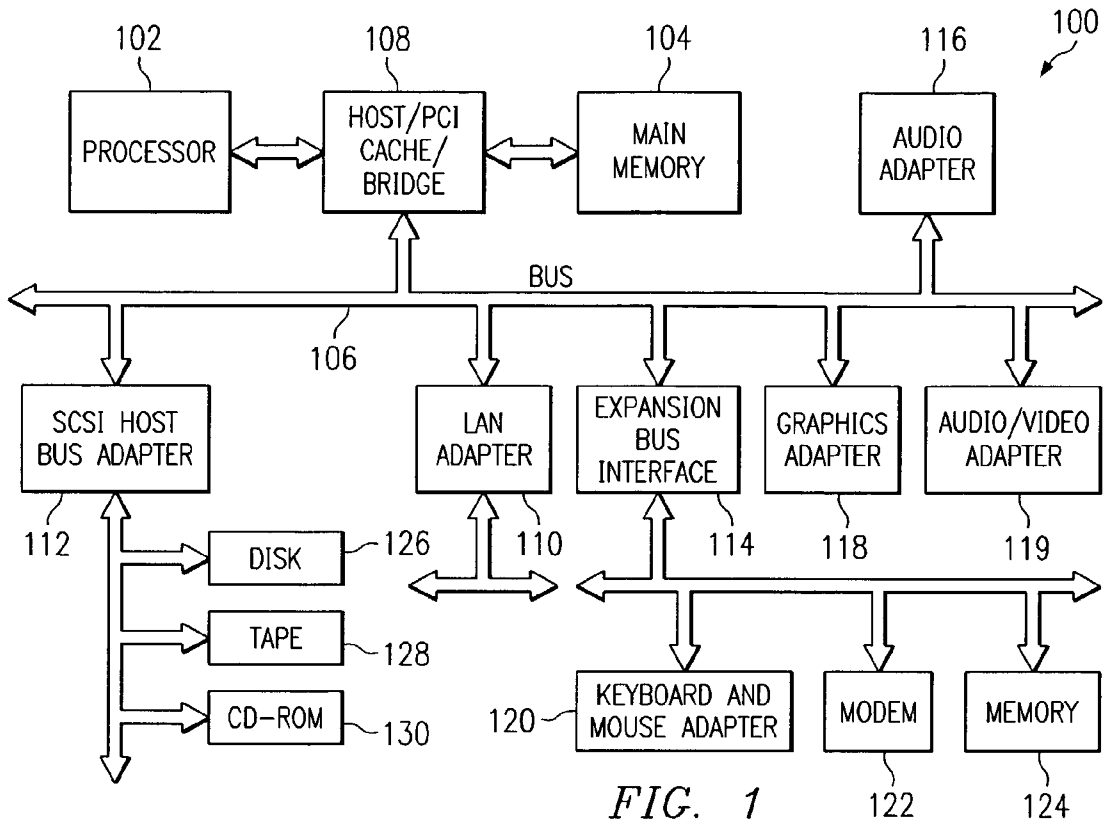
FIG. 1 is an exemplary block diagram of a computing device in accordance with the present invention.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. In a preferred embodiment, however, the operating system running on processor 102 is the Advanced Interactive Executive (AIX) operating system, available from International Business Machines, Incorporated.

An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 is not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126–130.

Figure 2:
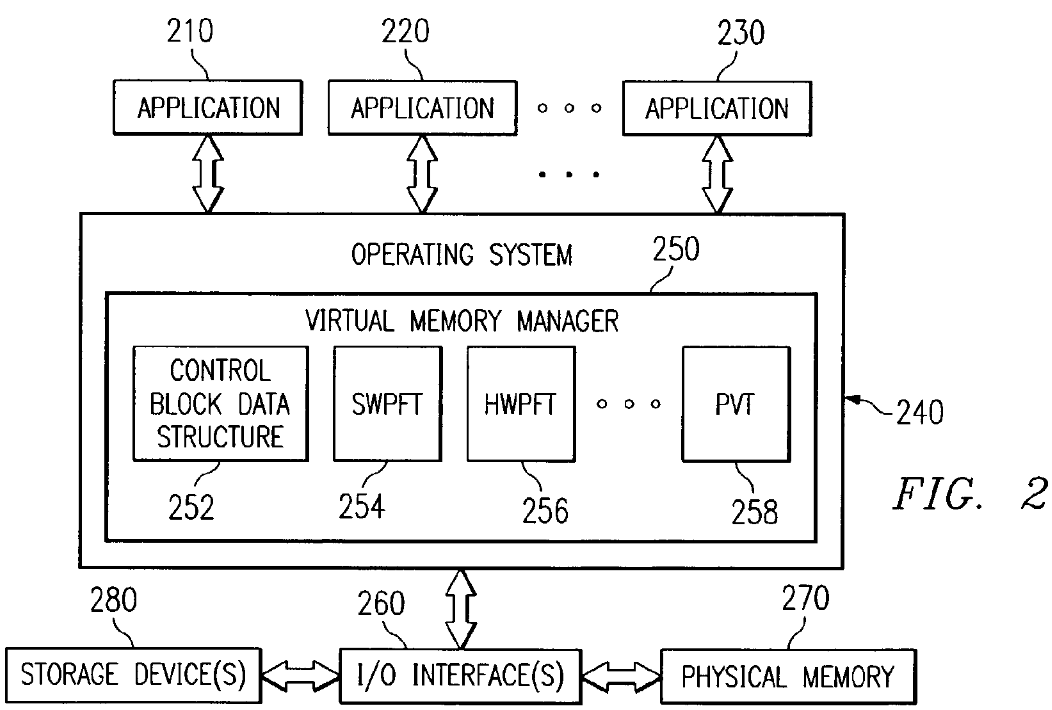
FIG. 2 is an exemplary block diagram illustrating a virtual memory manager in accordance with the present invention.

FIG. 2 is an exemplary block diagram illustrating a virtual memory manager in accordance with the present invention. As shown in FIG. 2, the applications 210–230 perform operations on data files by sending instructions to the operating system 240 to perform such data file operations. In a system in which virtual memory is utilized, a virtual memory manager 250 is provided in the operating system 240 for managing the virtual memory and translating between virtual addresses used by the applications 210–230 and physical address of the physical memory 270.

The virtual memory manager 250 maintains a number of data structures for managing the virtual memory. These data structures include a control block data structure 252, a software page frame table (SWPFT) 254 (also referred to as the "software page table"), a hardware page frame table (HWPFT) 256 (also referred to as the "hardware page table"), an alias page table (APT) 258, and the like. The HWPFT 256 is used by the system hardware to perform data access operations on data stored in physical memory. The HWPFT 256 maps virtual addresses used by the software to physical addresses of those pages of memory that are going to be regularly accessed by the system hardware, e.g., the processor.

In the event that the HWPFT 256 does not include an entry for a particular mapping of virtual to physical address, a page fault on the HWPFT 256 is generated. The page fault is handled by a fault handler of the virtual memory manager 250 which attempts to access the SWPFT 254 to identify the mapping and attempt to reload the mapping into the HWPFT 256. If the SWPFT 254 does not include the requested mapping, the fault handler of the virtual memory manager 250 then attempts to resolve the reload fault by identifying an alias mapping corresponding to the virtual address in the alias page table 258. If there is no corresponding alias mapping, then a page fault is handled by the operating system 240 in a known manner.

As previously stated above, the present invention provides a mechanism for running a virtual memory manager in virtual mode. With the present invention, mechanisms are provided for allowing a virtual memory manager to operate in virtual mode utilizing virtual addresses for all of its own data structures, thereby allowing for physical discontinuity of the physical memory backing those data structures. These mechanisms solve a number of problems associated with running a virtual memory manager in virtual mode including avoiding deadlocks, handling recursive faults, optimal hash distribution of virtual page translations for VMM metadata, and no significant performance degradation or additional path length in providing the virtual mode virtual memory manager.

The problem of avoiding deadlocks is addressed by the present invention by defining a set of virtual memory manager (VMM) data structures and VMM code text that must always be addressable, i.e. no faults are allowed on these data structures and code text, in order to guarantee forward progress. These data structures and code text, or code pages, are then pinned into the hardware page table. Pinning a hardware page table entry is a platform specific function. For example, in the PowerPC architecture, this means that pinned entries cannot be evicted from the hardware page table during a reload operation.

The problem of saturating a hardware page table group with pinned entries is addressed by not making all of the VMM data structures always addressable. By allowing some VMM data structures to be non-addressable at times, the pinned page table entry footprint caused by all of these data structures is minimized. Specifically, a second class of VMM data structures is defined that allows the VMM to page fault on them. A stack of fault handling execution stacks is implemented with the VMM fault handling code being completely reentrant. As a result, faults caused by the VMM itself are allowed and are handled by the present invention.

The problem of determining an optimal hash distribution of virtual page translations for VMM metadata is addressed by the present invention as a result of the solution to the problem of avoiding deadlocks. Specifically, the pinned page table entries need to be distributed throughout the page table to avoid filling up a page table group with only pinned entries. The virtual addresses of the pages are used to hash to a page table entry group (PTEG) within the page table. In the case of a full PTEG, unless the operating system can evict an entry, forward progress cannot be guaranteed for a page fault on a virtual address mapping. Thus, in the present invention, a VMM data structure virtual address space is defined such that it results in a hash distribution yielding no more than one pinned PTE per PTEG.

With the present invention, virtual segment identifiers for each VMM metadata segment that have no hash collision with virtual page numbers from any VMM metadata segment are selected. That is, virtual segment identifiers which are used along with a virtual page number to compute a page table entry group index into a hardware page table are selected so that every possible virtual segment identifier and virtual page number combination will result in a unique page table entry group index. This is done essentially by not utilizing any virtual segment identifier bits that might conflict with any virtual page number bits in the hash algorithm, and therefore only incrementing special virtual segment identifiers starting with a bit that is more significant than the most significant virtual page number bit.

With regard to the problem of not having any significant performance degradation or additional path length, when running the fault handling in physical mode, no faults were encountered by the fault handler and no space was occupied in the hardware page table for metadata segments. With the present invention, fault handling is running in virtual mode and thus, recursive faults can be encountered, segment lookaside buffer faults can be encountered, and the issue of page table entry group distribution of pinned page table entries exists. The issue of page table group distribution is handled in the manner previously discussed. The issue of recursive faults is handled by providing a mechanism for generating an effective address space from a second order metadata (KSP) or Kernel Special Purpose address space.

With the present invention, the KSP address has encoded therein, an indicator of KSP memory and the KSP virtual segment identifier. This means that at segment looksaside buffer fault time, no costly data structure lookup must be done, and in just a few machine instructions the faulting address can be recognized as a KSP address, the virtual segment identifier can be extracted, and the segment lookaside buffer reloaded. The cost of recursive faults is handled by monitoring statistics of second order faults and promoting a first order metadata structure to be a second order (pinned page table entry) metadata structure if it exceeds a threshold of allowed faults.

One primary function of the virtual memory manager is to resolve page faults due to translations missing from the hardware page table. The differences between how known virtual memory managers handle page faults and how the virtual mode virtual memory manager of the present invention handles page fault illustrates the primary elements of the present invention.

FIG. 3 is an exemplary flowchart outlining a page fault resolution operation according to known virtual memory managers. As shown in FIG. 3, the operation starts with a page fault being encountered when trying to determine the physical address associated with a virtual address (step 310). The page fault handler of the operating system kernel (also referred to as the "kernel") is then entered in physical translation mode (step 320). This page fault handler is logically part of the virtual memory manager (VMM).

A page fault occurs when the processor attempts to lookup a virtual to physical address translation in the hardware page table and there is no entry in the hardware page table for the mapping. That is, when the processor, on a load, store, or instruction reference to a virtual address, performs a hash on the virtual segment identifier and virtual page number of the faulting address to thereby index into the hardware page table group index, and a valid entry is not found with a matching virtual segment identifier and abbreviated page index, a page fault interrupt is caused. The page fault interrupt vectors execution to the operating system's interrupt vector for handling these interrupts. The VMM metadata structures, such as the software page table, alias page table, and the like, may be used in an attempt to process the fault caused by the processor.

The operating system kernel stays in physical mode and resolves the fault by accessing all required virtual memory manager metadata structures in physical mode (step 330). These metadata structures are any metadata structures that the virtual memory manager uses to manage virtual mappings for physical memory, such as a hardware page table, software page table, alias page table, software hash table, physical to page table entry index table, list of page table entry indices for a given physical page, address range table for special virtual to physical ranges, address range table for I/O virtual to physical ranges, and the like. Once the page fault is resolved using the page fault handler of the operating system kernel in physical mode, the operation returns control to the instruction causing the page fault (step 340) and the operation ends.

Figure 4:
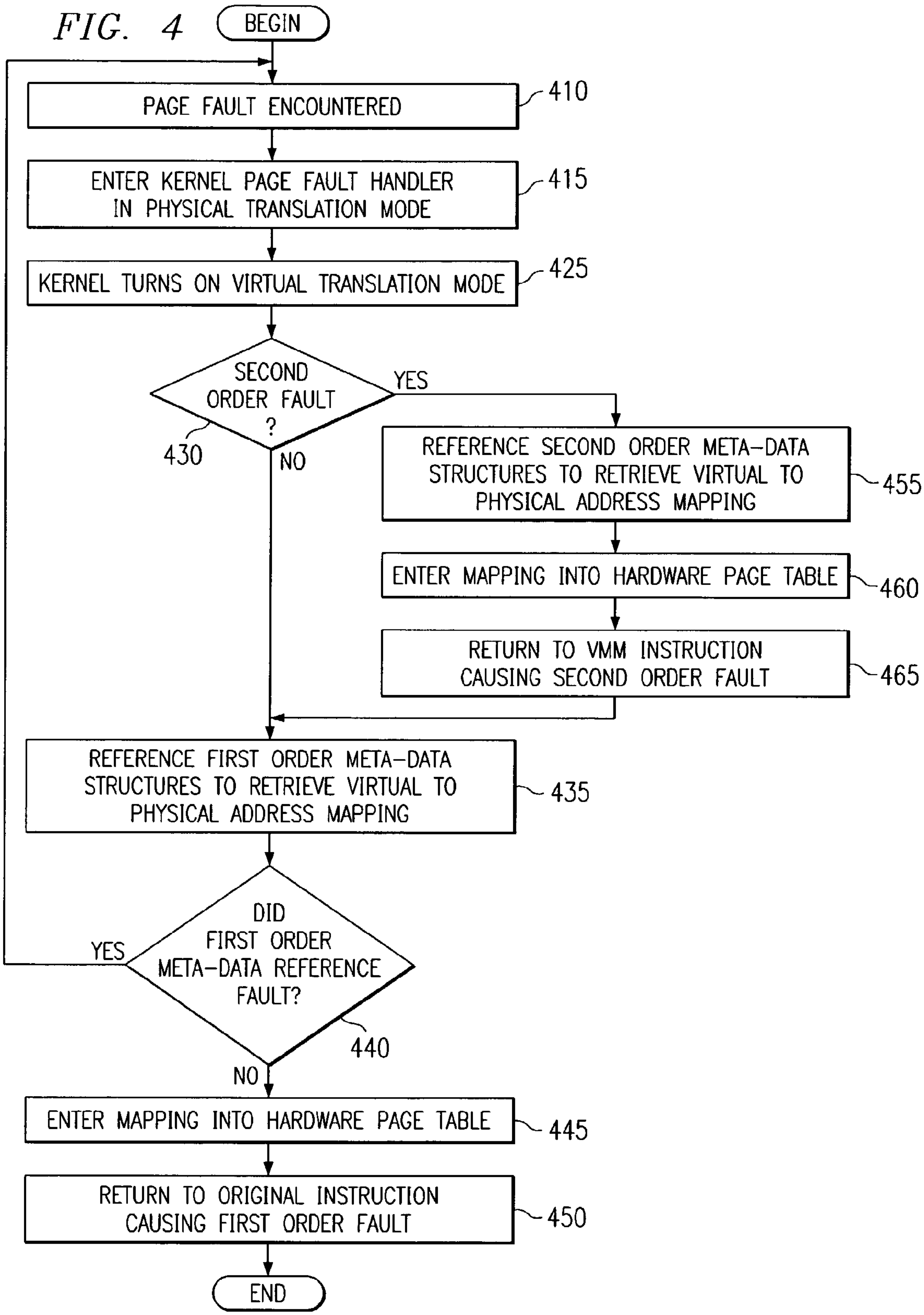
FIG. 4 is a flowchart outlining an exemplary operation for performing page fault handling according to the present invention.

FIG. 4 is a flowchart outlining an exemplary operation of the present invention. As shown in FIG. 4, the operation starts with a page fault being encountered (step 410) similar to the operation outlined in FIG. 3. The operating system kernel page fault handler is entered in physical translation mode (step 415). The operating system kernel then turns on virtual translation mode (step 425). For example, on the PowerPC architecture, bits, such as the data and instruction relocation bits of the machine status register, may be set to thereby turn on virtual translation.

A determination is then made as to whether the page fault is a second order page fault (step 430). A second order fault is a fault on a first order metadata reference. That is, when a page fault is first handled, it is a first order page fault and will follow the path of steps 410–450 shown in FIG. 4 and discussed further hereafter. If during an attempt to resolve the virtual address of the page fault using a first order metadata structure, this first order metadata structure does not have a virtual to physical mapping entry corresponding to the virtual address of the page fault, a fault on the first order metadata structure occurs. This fault causes the operation to return, or recurse, to step 410 where the fault is now designated a second order page fault and the operation follows the path of steps 410–430, 455–465, as discussed below.

Thus, while step 430 is shown as an active decision block, in actuality the determination as to whether a fault is a first or second order fault is passive in that there is no actual programmatic determination made as to whether this is a second order fault. The nature of the recursion show in FIG. 4 is that if it is recursing, then the fault is second order. The fault handler itself has no knowledge of what type of fault it is handling (either first or second order). If it has recursed and is now attempting to resolve a second order fault, the structures it indexes into and references for that fault have been predetermined to be second order and pinned in the page table. Thus, the fault handler performs the same actions for either a first order or a second order fault, the difference being only in that the results and side-effects differ depending on how deep the fault hander has recursed.

Returning to FIG. 4, if the page fault is not a second order page fault then it is a first order page fault and the first order virtual memory manager metadata structures are referenced to retrieve the virtual to physical address mapping (step 435). A determination is made as to whether there was a fault on the first order metadata reference (step 440), i.e. that the first order metadata references did not have a mapping for the virtual address. If so, the operation returns to step 410 to resolve the fault on the first order metadata reference. The page fault is now designated a second order page fault, as discussed previously.

If there is no fault on the first order metadata reference in step 440, the mapping identified using the first order metadata structure is loaded into the hardware page table (step 445). The operation then returns control to the original instruction causing the first order fault (step 450) and the operation ends.

If, in step 430, it is determined that the fault is a second order fault, the page fault handler references the second order metadata structures to retrieve a virtual to physical address mapping for the virtual address involved in the page fault (step 455). Since this is a second order metadata structure, by definition a fault cannot occur since the entries in the second order metadata structure are pinned in the hardware page table. Thus, there is no need to determine whether a fault occurs on the second order metadata structure.

The mapping identified in the second order metadata structure for the virtual address is then loaded into the hardware page table (step 460) and control is returned to the virtual memory manager instruction causing the second order fault (step 465). The virtual memory manager instruction referred to in step 465 is the fault handling instruction that references the first order metadata that caused the recurse. This time, the first order reference will not fault because the translation was installed in the hardware page table through the recursion. When the operation returns to the VMM instruction, execution proceeds on the original fault as if the second order fault had never happened.

Thus, where the prior art mechanisms for handling page faults are performed in physical mode, and thus, there is no possibility of faulting on data structures used to resolve the original page fault, the present invention provides a mechanism for resolving page faults in virtual mode so that faults on the data structures used to resolve the original page fault are possible. As a result, mechanisms are provided for handling such faults by providing first and second order metadata structures which can be used to resolve the original page fault and any faults on the data structures used to resolve the original page fault.

FIG. 5 illustrates the relationships of the virtual memory manager data structures and code text. As shown in FIG. 5, the system wide virtual address space data structures 510 are used during normal operations of the computing device to handle references to data and instructions. This system wide virtual address space is used for application text and data and operating system kernel and kernel extension text and data.

When there is a data or instruction reference fault, e.g., a reference to a virtual address for which there is no mapping in the hardware page table, the first order virtual memory metadata structures 520 are used to attempt to handle the fault. The first order virtual memory metadata data structures contain virtual to physical address mapping information for general use in the system wide virtual address space 510.

If there is a fault on the first order virtual memory metadata structures 520, second order virtual memory metadata structures 530 are utilized for resolving the fault on the first order virtual memory metadata structures 520 and ultimately the original data or instruction reference fault. The second order virtual memory metadata structures use virtual to physical address mapping information stored in the hardware page table in pinned entries. That is, the entries of the hardware page table that are referenced by the second order virtual memory metadata structures are non-removable entries that cannot be removed by a reload operation on the hardware page table. Thus, theses entries are guaranteed to be present in the hardware page table and there can be no faults on these second order virtual memory metadata structures.

The only difference between first order virtual memory metadata data structures and second order virtual memory metadata data structures is that the second order virtual memory metadata data structures are pinned in the hardware page table and operations on first order virtual memory metadata data structures can result in recursion. First order virtual memory metadata data structures are the metadata structures (or portions of metadata structures) required to process translation faults for system-wide virtual addresses. In an exemplary embodiment, the alias page table, software hash table, and portions of the software page table not covering physical memory used by second order data structures are considered first order virtual memory metadata data structures.

Second order virtual memory metadata data structures are the metadata structures (or portions of metadata structures) required to process translation faults on first order data structures. In an exemplary embodiment, the hardware page table (HWPFT), physical to page table entry index table (PVT), list of page table entry indices for a given physical page (PVLIST), and portions of the software page table (SWPFT) that correspond to physical memory used by these data structures are considered second order metadata data structures. The virtual address mappings are PTE pinned within the HWPFT. Other data structures such as the alias page table (APT), software hash table (SWHAT), portions of the software page table (SWPFT) that do not correspond to physical memory used by second order data structures, etc., are considered first order metadata structures. A first order metadata data structure may be promoted to second order dynamically simply by pinning a page table entry encountering recursive faults while handling first order faults. Thus, page table entries may be pinned "on the fly" as a form of self-tuning optimization.

FIG. 6 is an exemplary diagram illustrating a page table entry, such as a hardware page table entry according to the present invention. The particular page table entry shown is for the PowerPC architecture, however the invention is not limited to such. It should be appreciated that different fields, information, and the like, may be stored in the page table entry depending on the particular architecture and implementation of the present invention, without departing from the spirit and scope of the present invention.

As shown in FIG. 6, a page table entry 600 includes a virtual segment identifier (VSID) 610 and abbreviated page index (API) 620. These elements 610 and 620 constitute a virtual address. In addition, the page table entry includes a pinned page table entry bit P 630 which is set when the entry is pinned and cannot be removed to make room in the page table for a reloaded entry. When this bit 630 is set, the page table entry 600 is guaranteed to be present in the page table for later use. Of course it is not beneficial to have every element of the page table pinned, as previously discussed.

The page table entry further includes a hash function identifier H 640 and a valid bit V 650. The hash function identifier H 640 is used to indicate which hash function was used (primary or secondary) to the generate a page table entry group index. The valid bit V 650 is used to indicate whether the page table entry is valid. The page table entry also includes a real page number (RPN) 660 which is the physical address of the memory page corresponding to the page table entry 600. Associated with the RPN 660 is a referenced bit R 670, a changed bit C 680, caching attributes (WIMG) 690, and page prefection PP 695. The referenced bit R 670 is a bit indicating the particular page has been referenced via this virtual address mapping. The changed bit C 680 is a bit indicating that the particular page has been changed via this virtual address mapping. The caching attributes (WIMG) 690 are caching attributes for the page (write-thru, inhibited, memory-coherent, guarded). The page prefection PP 695 are bits indicating what accesses are allowed to the page (read-only, read-write, noaccess, etc.).

The important elements of FIG. 6 with regard to the present invention are the VSID 610, pinned page table entry bit P 630 and the RPN 660. When there is a page fault, what is meant is that there is no valid entry in the page table group as indexed by the hashed virtual segment identifier and virtual page number that corresponds to a virtual address referenced by the instruction causing the fault. It is at this time that the first order virtual memory manager (VMM) metadata is used to attempt a reload of the virtual (VSID and associated page attributes) to physical (RPN) address mapping into the hardware page table. This first order VMM metadata points to data structures that are searched for a corresponding virtual to physical address mapping. If one exists, it is loaded into the hardware page table.

The mapping is loaded into the hardware page table by storing the page table entry information in an available entry space of the hardware page table. If there is no available space, the mapping is reloaded by removing an existing page table entry that does not have the pinned page table entry 630 set and storing the new page table entry in its place.

If there is no virtual to physical address mapping corresponding to the virtual address of the page fault found by using the first order metadata structures, a fault on the first order metadata structures occurs and the second order metadata structures are used to resolve the fault on the first order metadata structures. The page table entries referenced by the second order metadata structures have the pinned page table entry bit P 630 set and thus, are always available for resolving faults on the first order metadata structures.

FIG. 6 illustrates the contents of a single page table entry as found in the PowerPC architecture which represents one of the individual blocks shown in FIG. 9. FIG. 9 illustrates a page table as found in the PowerPC architecture organized by page table groups. The index into the page table shown in FIG. 9 is computed by a hash function as found in the PowerPC architecture on the virtual segment identifier and virtual page number, as illustrated in FIG. 10. As shown in FIG. 10, that hash function includes the lower order 39 bits of the virtual segment identifier being XORed with the virtual page number to generate a hash value. The lower 28 bits of the hash value are ANDed with a hash mask determined by the size of the hardware page table. The result along with the lower order 11 bits of the hash value are used to index into the page table.

Figure 7:
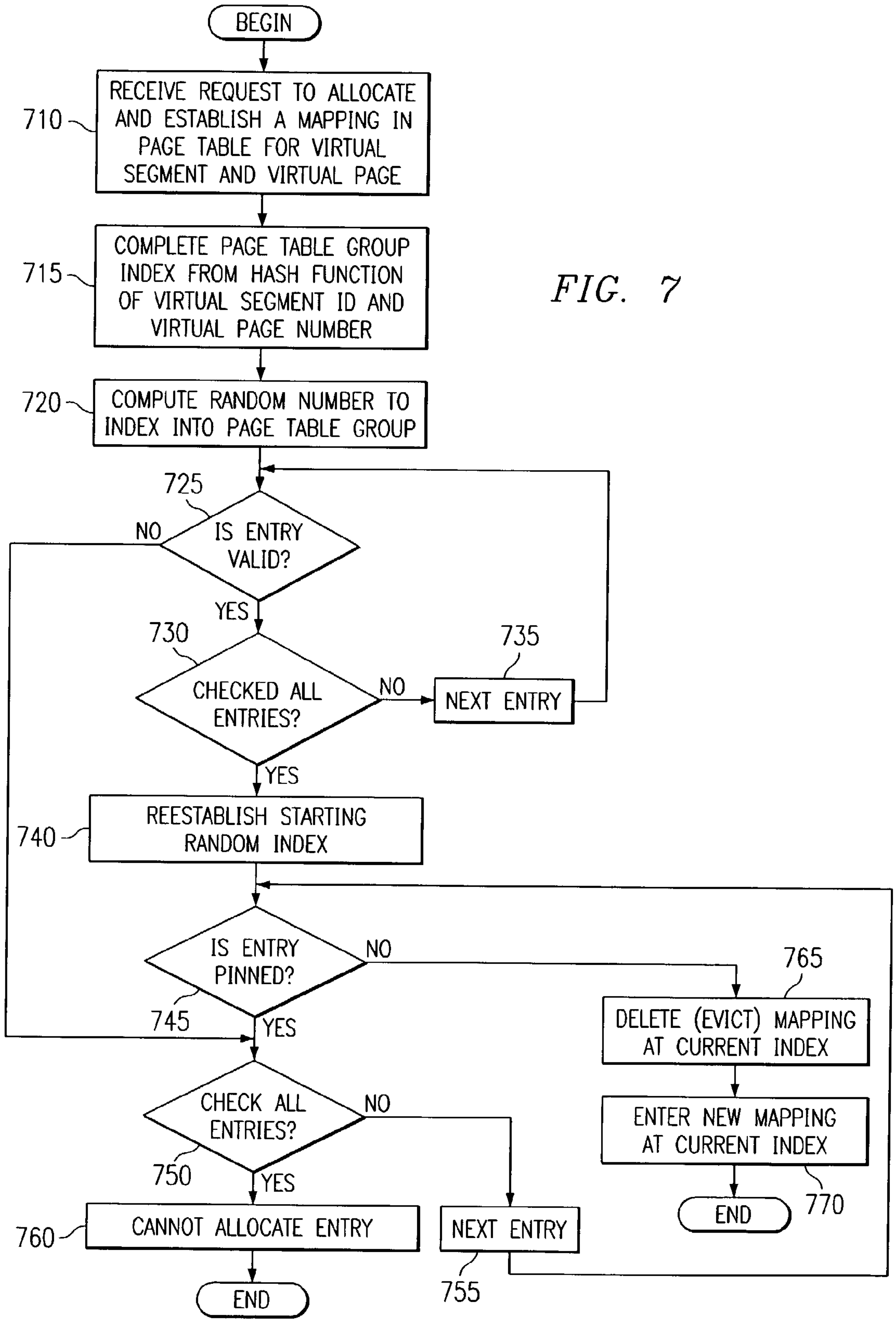
FIG. 7 is a flowchart outlining a page table entry allocation operation in accordance with the present invention.

The way that the elements of the page table entry are utilized when performing a page table entry allocation is shown in FIG. 7. As shown in FIG. 7, the operation for allocating a page table entry starts with receiving a request to allocate and establish a mapping in a page table for a virtual segment and virtual page (step 710). A page table group index is computed from a hash function of the virtual segment identifier (VSID) and virtual page number (step 715). A random number is then computed to index into the page table group (step 720). A random index within the page table entry group is used to optimize for finding a free entry quickly (as opposed to always searching from the beginning) and to ensure random eviction if eviction is needed.

A determination is made as to whether the entry in the page table group to which the random number indexes is valid (step 725). This may involve reading the valid bit V of the page table entry, for example. The valid bit within a page table entry represents that the page table entry slot is in use or not. An invalid entry is considered free for allocation and subsequent use. Any entry becomes invalid when the operating system decides to explicitly remove a virtual to physical translation. For example, when a process exits, its address space is no longer valid and can be dismantled.

If the entry is valid, a determination is made as to whether all entries in the page table group have been checked (step 730). If not, the next entry is identified (step 735) and the operation returns to step 725.

If all entries have been checked, the starting random index is reestablished (step 740). That is, the random index generated earlier is reused. Thereafter, or if the entry is not valid in step 725, a determination is made as to whether the entry at the reestablished random index is pinned (step 745). If the entry is pinned, a determination is made as to whether all entries have been checked (step 750). If not, the next entry is identified and the operation returns to step 745. If all entries have been checked, a message is returned that the new entry cannot be allocated (step 760) and the operation terminates.

If the entry is not pinned (step 745), the mapping at the current index is evicted (step 765) and the new mapping is entered at the current index (step 770) with the operation terminating thereafter.

FIG. 8 is an exemplary diagram of the second order virtual memory manager metadata effective address space according to the present invention. An effective address is the address used by the processor when running in virtual mode (data and instruction relocation enabled). The CPU uses this effective address to then generate a fully qualified virtual address by determining the VSID and VPNO corresponding to the effective address. On the PowerPC architecture the CPU determines the VSID by performing a segment table or segment lookaside buffer lookup using the most significant 36 bits of the effective address. The VPNO is determined from the next most significant 16 bits, and finally the page offset is determined by the lower order 12 bits of the effective address. As shown in FIG. 8, the second order virtual memory manager metadata includes a kernel special purpose effective address space 810, a virtual segment identifier 820, a virtual page number 830 and a byte offset 840. The kernel special purpose effective address space 810 is used to designate the address space as special and specifically allows for the segment lookaside buffer fault handler to quickly recognize the address space and quickly determine the virtual segment identifier to load. The virtual segment identifier 820, in an exemplary embodiment, is bits 19–47 of the virtual segment ID. The virtual page number 830 is a 16 bit virtual page number that identifies a page of a virtual segment.

The virtual segment identifier 820 is a segment identifier used to uniquely identify a virtual segment of memory. The virtual segment identifier selection is critical to hash distribution. Because of the hash distribution, and a desire to have only one VMM metadata page per page table entry group, the low 16 bits (48–63) of the virtual segment identifier are not used, i.e. they are "0". The largest VMM virtual segment identifier is limited so that there is no need for bits that are more significant than bit 19. As a result, in the exemplary embodiment shown in FIG. 8, bits 19–47 of the virtual segment identifier are encoded into the effective address of the virtual memory manager metadata.

The virtual segment identifier 820 may be used to identify an effective address for the second order VMM metadata. For example, the virtual segment identifier is equal to bits 19–47 of the effective address. The effective address generated in the manner depicted in FIG. 8 provides for very quick conversion from the effective address to the virtual segment identifier for purposes of reloads, such as segment lookaside buffer fault reloads and page table entry fault reloads. For either of these faults, the only thing that is known is what was the effective address that was faulted on. In the case of a segment lookaside buffer fault, the operating system must determine what virtual segment identifier needs to be loaded into the segment table/segment lookaside buffer. In the case of page table entry faults, the operating system must determine the virtual segment identifier for performing the hash function into the page table and for storing into the page table entry.

For example, when a load, store or instruction fetch to an effective address is performed (like that shown in FIG. 8), the processor takes the high 36 bits of the effective address as an effective segment identifier (ESID). The processor takes the low 28 bits of the effective address as an offset into the memory segment. The processor then uses the ESID to perform a lookup in a segment table and/or segment lookaside buffer (SLB) to locate the segment mapping for that ESID. If no mapping is found, the processor generates as segment table or SLB fault (in which case the operating system must resolve the SLB fault and load an SLB). The operating system's SLB fault handler, in the case of a kernel special purpose effective address, can simply extract the VSID from the faulting effective address, and reload the SLB entry.

If the mapping is found or has been reloaded by the operating system SLB fault handler, it contains the virtual segment identifier for the segment and the processor extracts the virtual segment identifier. The processor then performs the hash function of FIG. 10 using the virtual segment identifier from the segment lookup and the virtual page number from the effective address, which results in an index into the page table to a page table entry group (PTEG).

The processor starts looking at the individual page table entries in that group looking for a valid entry with a virtual segment identifier and abbreviated page index (API), or select bits from the VPNO, match for the virtual segment identifier/virtual page number referenced. If found, the processor extracts the real page number (RPN) from the page table entry, concatenates the 12 bit page offset from the effective address, and forwards the load, store, or instruction fetch to the memory controller with the fully qualified physical address.

If a matching entry is not found, the processor uses the secondary hash function (e.g., 1's complement of the first hash function) to generate a secondary PTEG index. The processor then searches that PTEG for a valid entry for the referenced virtual segment identifier/virtual page number. If found, the processor extracts the real page number, concatenates the 12 bit page offset from the effective address and forwards it to the memory controller. If not found, the processor generates the appropriate fault interrupt at which time the operating system fault handler of the present invention must resolve the fault.

Thus, the present invention provides a mechanism for running a virtual memory manager in virtual mode. As a result, the requirements of contiguous physical memory are avoided. The present invention further provides solutions to the many problems associated with the running of a virtual memory manager in virtual mode such as avoiding deadlocks, handling recursive faults, optimal hash distribution of virtual page translations for VMM metadata, and no significant performance degradation or additional path length in providing the virtual mode virtual memory manager.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of handling a page fault in a virtual memory manager of a data processing system, comprising:

attempting to resolve the page fault using first order virtual memory manager metadata;

determining if a fault occurs during the attempt to resolve the page fault using the first order virtual memory manager metadata;

in response to a fault occurring during the attempt to resolve the page fault using the first order virtual memory manager metadata, using second order virtual memory manager metadata to resolve a fault on the first order virtual memory manager metadata; and providing a virtual memory manager data structure virtual address space that is defined such that a hash distribution in the virtual memory manager data structure virtual address space yields no more than one pinned page table entry per page table entry group in a page table.

2. The method of claim 1, wherein the second order virtual memory manager metadata is associated with pinned entries in the page table.

3. The method of claim 1, wherein resolving the fault on the first order virtual memory manager metadata includes loading a virtual address to physical address mapping from a page table entry into the first order virtual memory manager metadata.

4. The method of claim 3, further comprising:

resolving the page fault using the first order virtual memory manager metadata after resolving a fault on the first order virtual memory metadata using the second order virtual memory manager metadata.

5. The method of claim 1, further comprising:

returning control to a faulting instruction after having resolved the page fault and a fault on the first order virtual memory manager metadata if any.

6. The method of claim 1, further comprising:

promoting the first order virtual memory manager metadata to second order virtual memory manager metadata in response to predetermined criteria being met as a self-tuning performance optimization.

7. The method of claim 6, wherein the first order virtual memory manager metadata is promoted to second order virtual memory manager metadata by pinning the first order virtual memory manager metadata in the page table.

8. The method of claim 2, wherein there is at most one pinned entry in the page table per page table entry group.

9. The method of claim 1, wherein attempting to resolve the page fault using first order virtual memory manager metadata includes:

applying a hash function to a virtual address associated with an instruction to generate an index into a page table entry group of the page table; and searching the page table entry group indexed by the hash of the virtual address to identify an entry corresponding to the virtual address.

10. The method of claim 9, wherein attempting to resolve the page fault using first order virtual memory manager metadata further includes generating the virtual address from an effective address.

11. The method of claim 10, wherein the effective address includes a kernel special purpose address space identifier and a virtual segment identifier encoded in the effective address.

12. A computer program product in a computer recordable medium for handling a page fault in a virtual memory manager of a data processing system, comprising:

first instructions for attempting to resolve the page fault using first order virtual memory manager metadata;

second instructions for determining if a fault occurs during the attempt to resolve the page fault using the first order virtual memory manager metadata;

third instructions for, in response to a fault occurring during the attempt to resolve the page fault using the first order virtual memory manager metadata, using second order virtual memory manager metadata to resolve a fault on the first order virtual memory manager metadata; and fourth instructions for providing a virtual memory manager data structure virtual address space that is defined such that a hash distribution in the virtual memory manager data structure virtual address space yields no more than one pinned page table entry per page table entry group in a page table.

13. The computer program product of claim 12, wherein the second order virtual memory manager metadata is associated with pinned entries in the page table.

14. The computer program product of claim 12, wherein the third instructions for resolving the fault on the first order virtual memory manager metadata include instructions for loading a virtual address to physical address mapping into a page table entry from the second order virtual memory manager metadata.

15. The computer program product of claim 14, further comprising:

fourth instructions for resolving the page fault using the first order virtual memory manager metadata after resolving a fault on the first order virtual memory metadata using the second order virtual memory manager metadata.

16. The computer program product of claim 12, further comprising:

fourth instructions for returning control to a faulting instruction after having resolved the page fault and a fault on the first order virtual memory manager metadata if any.

17. The computer program product of claim 12, further comprising: fourth instructions for promoting the first order virtual memory manager metadata to second order virtual memory manager metadata in response to predetermined criteria being met as a self-tuning performance optimization.

18. The computer program product of claim 17, wherein the first order virtual memory manager metadata is promoted to second order virtual memory manager metadata by pinning the first order virtual memory manager metadata in the page table.

19. The computer program product of claim 13, wherein there is at most one pinned entry in the page table per page table entry group.

20. The computer program product of claim 12, wherein the first instructions for attempting to resolve the page fault using first order virtual memory manager metadata include:

instructions for applying a hash function to a virtual address associated with an instruction to generate an index into a page table entry group of the page table; and instructions for searching the page table entry group indexed by the hash of the virtual address to identify an entry corresponding to the virtual address.

21. The computer program product of claim 20, wherein the first instructions for attempting to resolve the page fault using first order virtual memory manager metadata further include instructions for generating the virtual address from an effective address.

22. The computer program product of claim 21, wherein the effective address includes a kernel special purpose address space identifier and a virtual segment identifier encoded in the effective address.

23. An apparatus for handling a page fault in a virtual memory manager of a data processing system, comprising:

means for attempting to resolve the page fault using first order virtual memory manager metadata;

means for determining if a fault occurs during the attempt to resolve the page fault using the first order virtual memory manager metadata;

means for, in response to a fault occurring during the attempt to resolve the page fault using the first order virtual memory manager metadata, using second order virtual memory manager metadata to resolve a fault on the first order virtual memory manager metadata; and means for providing a virtual memory manager data structure virtual address space that is defined such that a hash distribution in the virtual memory manager data structure virtual address space yields no more than one pinned page table entry per page table entry group in a page table.

24. A method of implementing a virtual memory manager in virtual mode on a data processing system, comprising:

providing a page table that stores virtual address to physical address mappings;

providing first order virtual memory manager metadata that is used by the virtual memory manager to handle general system wide page faults;

providing second order virtual memory manager metadata that is used to handle faults on the first order virtual memory manager metadata; and providing a virtual memory manager data structure virtual address space that is defined such that a hash distribution in the virtual memory manager data structure virtual address space yields no more than one pinned page table entry per page table entry group.

25. The method of claim 24, wherein the second order virtual memory metadata are pinned entries in a page table.

26. The method of claim 25, wherein there is at most one pinned page table entry per page table entry group in the page table.

* * * * *